US012342794B2

(12) United States Patent
Milluzzi et al.

(10) Patent No.: US 12,342,794 B2
(45) Date of Patent: Jul. 1, 2025

(54) ENRICHMENT DEVICE FOR MAMMALS

(71) Applicant: Disney Enterprises, Inc., Burbank, CA (US)

(72) Inventors: Andrew J. Milluzzi, Clermont, FL (US); Angela Miller, Minneola, FL (US); Sylvester Kwo, Orlando, FL (US); Kathryn Skobrak, Winter Garden, FL (US); Patrick M. Potts, Davenport, FL (US); Jose Dominguez, Wesley Chapel, FL (US); Cecelia Dahlinger, Winter Garden, FL (US); Emma Lee, Orlando, FL (US); Michael Breen, Winter Garden, FL (US); Andrew Alba, Clermont, FL (US)

(73) Assignee: Disney Enterprises, Inc., Burbank, CA (US)

( * ) Notice: Subject to any disclaimer, the term of this patent is extended or adjusted under 35 U.S.C. 154(b) by 185 days.

(21) Appl. No.: 18/349,119

(22) Filed: Jul. 7, 2023

(65) Prior Publication Data
US 2024/0268348 A1    Aug. 15, 2024

Related U.S. Application Data

(60) Provisional application No. 63/484,270, filed on Feb. 10, 2023.

(51) Int. Cl.
*A01K 29/00* (2006.01)
*H04W 4/021* (2018.01)
*A01K 15/02* (2006.01)

(52) U.S. Cl.
CPC .......... *A01K 29/005* (2013.01); *H04W 4/021* (2013.01); *A01K 15/025* (2013.01)

(58) Field of Classification Search
CPC .. A01K 29/005; A01K 15/025; A01K 11/008; A01K 15/023; H04W 4/021
See application file for complete search history.

(56) References Cited

U.S. PATENT DOCUMENTS

| | | | |
|---|---|---|---|
| 2002/0017995 A1* | 2/2002 | Touchton | A01K 15/023 340/573.1 |
| 2005/0005873 A1* | 1/2005 | Gick | A01K 15/025 119/707 |

(Continued)

*Primary Examiner* — Ryan W Sherwin
(74) *Attorney, Agent, or Firm* — Foley & Lardner LLP

(57) ABSTRACT

In some implementations, a controller may obtain global positioning system (GPS) data from a GPS unit of an enrichment device. The controller may determine habitat information identifying a habitat for animals, of a plurality of habitats of animals, using the GPS data. The controller may determine a geofence of the habitat for animals based on the habitat information. The controller may determine a movement profile associated with the habitat for animals using the habitat information. The movement profile identifies one or more motions of the enrichment device. The controller may cause the enrichment device to move, within a boundary of the geofence, in accordance with the one or more motions of the movement profile. The enrichment device may move in accordance with the one or more motions to stimulate movement of one or more animals of the habitat for animals. The controller may monitor the movement and/or animal interaction.

20 Claims, 10 Drawing Sheets

(56) References Cited

U.S. PATENT DOCUMENTS

| | | | |
|---|---|---|---|
| 2007/0095304 A1* | 5/2007 | Rosenberg | A01K 29/00 119/720 |
| 2007/0266959 A1* | 11/2007 | Brooks | A01K 29/005 119/720 |
| 2008/0272920 A1* | 11/2008 | Brown | G08B 13/1427 340/573.3 |
| 2010/0139569 A1* | 6/2010 | Xu | A01K 15/021 700/258 |
| 2010/0250199 A1* | 9/2010 | Breedlove | A01K 1/00 703/1 |
| 2012/0312250 A1* | 12/2012 | Jesurum | A01K 15/023 119/721 |
| 2014/0120943 A1* | 5/2014 | Shima | G01S 19/48 455/456.1 |
| 2014/0290582 A1* | 10/2014 | Crumlin | A01K 15/025 119/51.01 |
| 2015/0245593 A1* | 9/2015 | O'Mara | A01K 15/025 446/457 |
| 2015/0342150 A1* | 12/2015 | Womble | A01K 15/02 119/718 |
| 2016/0205894 A1* | 7/2016 | Kim | A01K 29/005 |
| 2016/0262355 A1* | 9/2016 | Swan | A01K 29/005 |
| 2016/0266258 A1* | 9/2016 | Huang | G01S 19/34 |
| 2017/0064926 A1* | 3/2017 | Gutierrez | A01K 5/00 |
| 2017/0081027 A1* | 3/2017 | Bivens | B64U 10/13 |
| 2017/0127652 A1* | 5/2017 | Shen | A01K 15/023 |
| 2017/0238505 A1* | 8/2017 | Gordon | A01K 15/00 |
| 2017/0372581 A1* | 12/2017 | Solinsky | G08B 21/0269 |
| 2018/0027772 A1* | 2/2018 | Gordon | A01K 1/0029 |
| 2019/0069518 A1* | 3/2019 | Falbaum | A01K 15/025 |
| 2019/0174723 A1* | 6/2019 | Umegård | A01K 11/008 |
| 2020/0260686 A1* | 8/2020 | Lee | B60K 1/04 |
| 2021/0059213 A1* | 3/2021 | Wooten | A01K 3/001 |
| 2022/0087229 A1* | 3/2022 | Wernimont | A61B 5/1118 |
| 2023/0292716 A1* | 9/2023 | Mundell | A01K 29/005 119/712 |
| 2024/0016122 A1* | 1/2024 | Carmody, III | A01K 15/027 |
| 2025/0049000 A1* | 2/2025 | Woodhouse | A01K 27/009 |

* cited by examiner

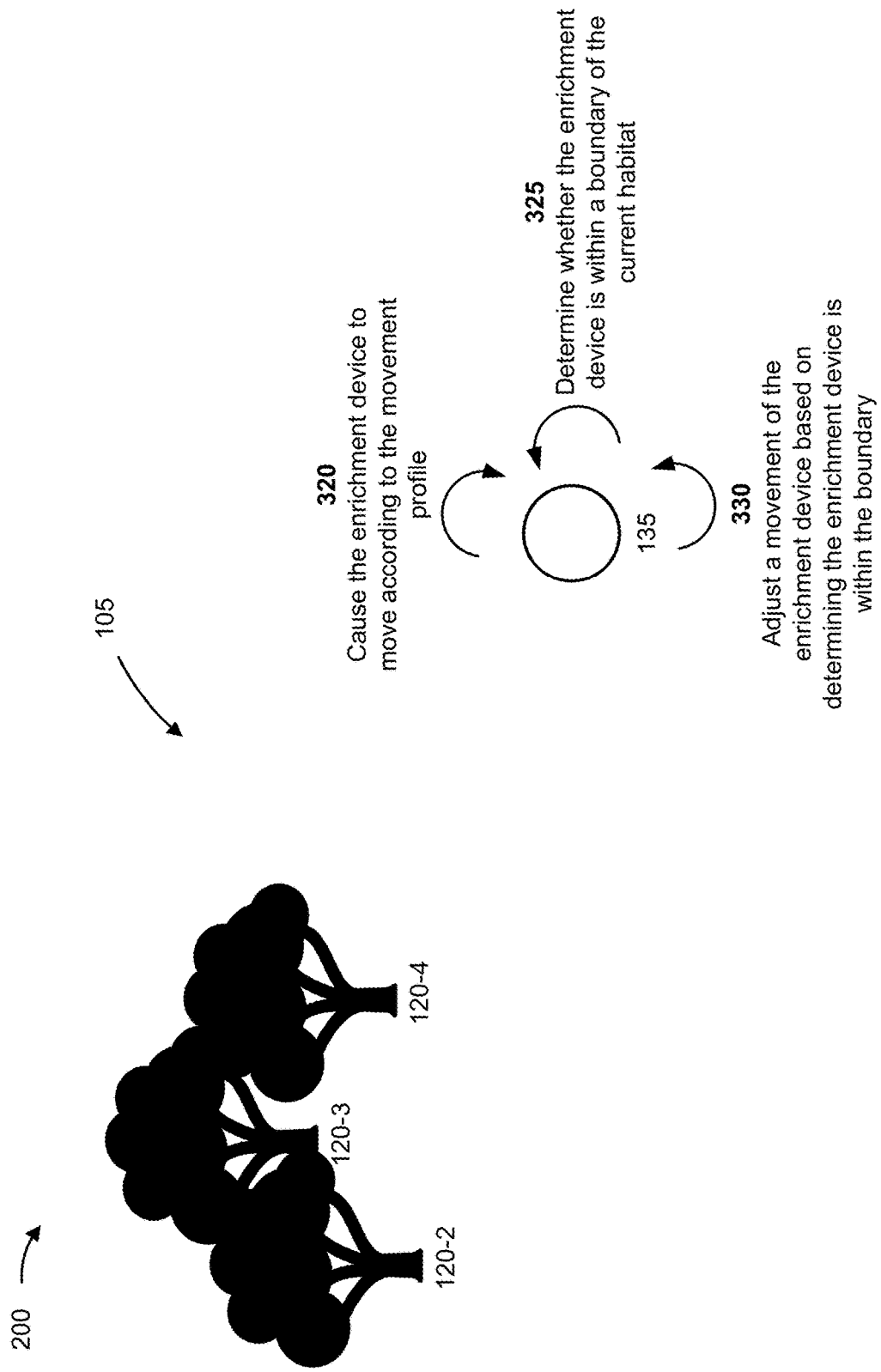

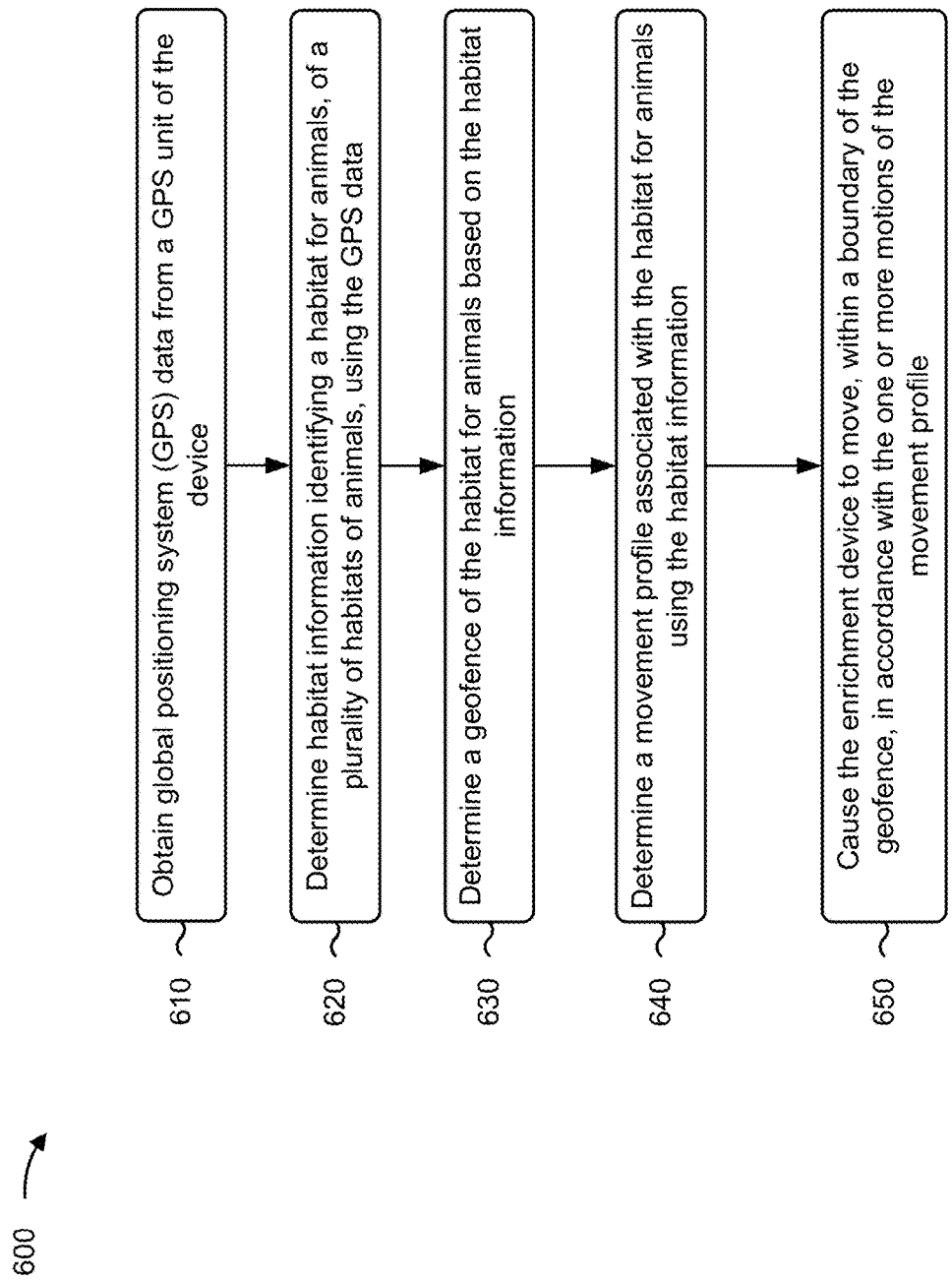

ENRICHMENT DEVICE FOR MAMMALS

RELATED APPLICATION

This application claims priority to U.S. provisional patent application Ser. No. 63/484,270, filed Feb. 10, 2023, which is incorporated herein by reference in its entirety.

BACKGROUND

A ball may be used to stimulate movement of an animal to meet species appropriate behavioral goals for the animal, leading to opportunities for great animal welfare. In some situations, the ball may include a motor that causes the ball to move.

SUMMARY

In some implementations, a method performed by a controller of an enrichment device includes obtaining global positioning system (GPS) data from a GPS unit of the enrichment device; determining habitat information identifying a habitat for animals, of a plurality of habitats of animals, using the GPS data; determining a geofence of the habitat for animals based on the habitat information; determining a movement profile associated with the habitat for animals using the habitat information, wherein the movement profile identifies one or more motions of the enrichment device; and causing the enrichment device to move, within a boundary of the geofence, in accordance with the one or more motions of the movement profile, with the enrichment device moving in accordance with the one or more motions to stimulate movement of one or more animals of the habitat for animals.

In some implementations, an enrichment device includes a global positioning system (GPS) unit; and a controller configured to: determine habitat information identifying a habitat for animals, of a plurality of habitats of animals, using first GPS data generated by the GPS unit; detect an animal interaction indicating that an animal, of the habitat, is interacting with the enrichment device; determine a location of the animal interaction using second GPS data generated by the GPS unit; update the habitat information to include desired location information identifying the location as a desired location, wherein the desired location information includes the second GPS data; and cause the enrichment device to move from a current location of the enrichment device to the desired location to stimulate one or more additional animal interactions.

In some implementations, a non-transitory computer-readable medium storing a set of instructions includes one or more instructions that, when executed by one or more processors of an enrichment device, cause the enrichment device to: determine habitat information identifying a geographical area for animals of a plurality of geographical areas for animals, wherein the geographical area is identified using first GPS data generated by the GPS unit of the enrichment device; determine that an animal interaction is not detected a first location corresponding to the first GPS data; cause the enrichment device to move to a second location; detect one or more animal interactions indicating that an animal is interacting with the enrichment device, wherein the one or more animal interactions are determined at the second location; determine a location of the animal interaction using second GPS data generated by the GPS unit; and update the habitat information to include desired location information identifying the second location as a desired location, wherein the desired location information includes second GPS data by the GPS unit at the second location.

BRIEF DESCRIPTION OF THE DRAWINGS

FIGS. 3A-3E are diagrams of an example implementation described herein.

FIG. 6 is a flowchart of an example process relating to stimulating and recording movements of an animal.

DETAILED DESCRIPTION

Figure 1:
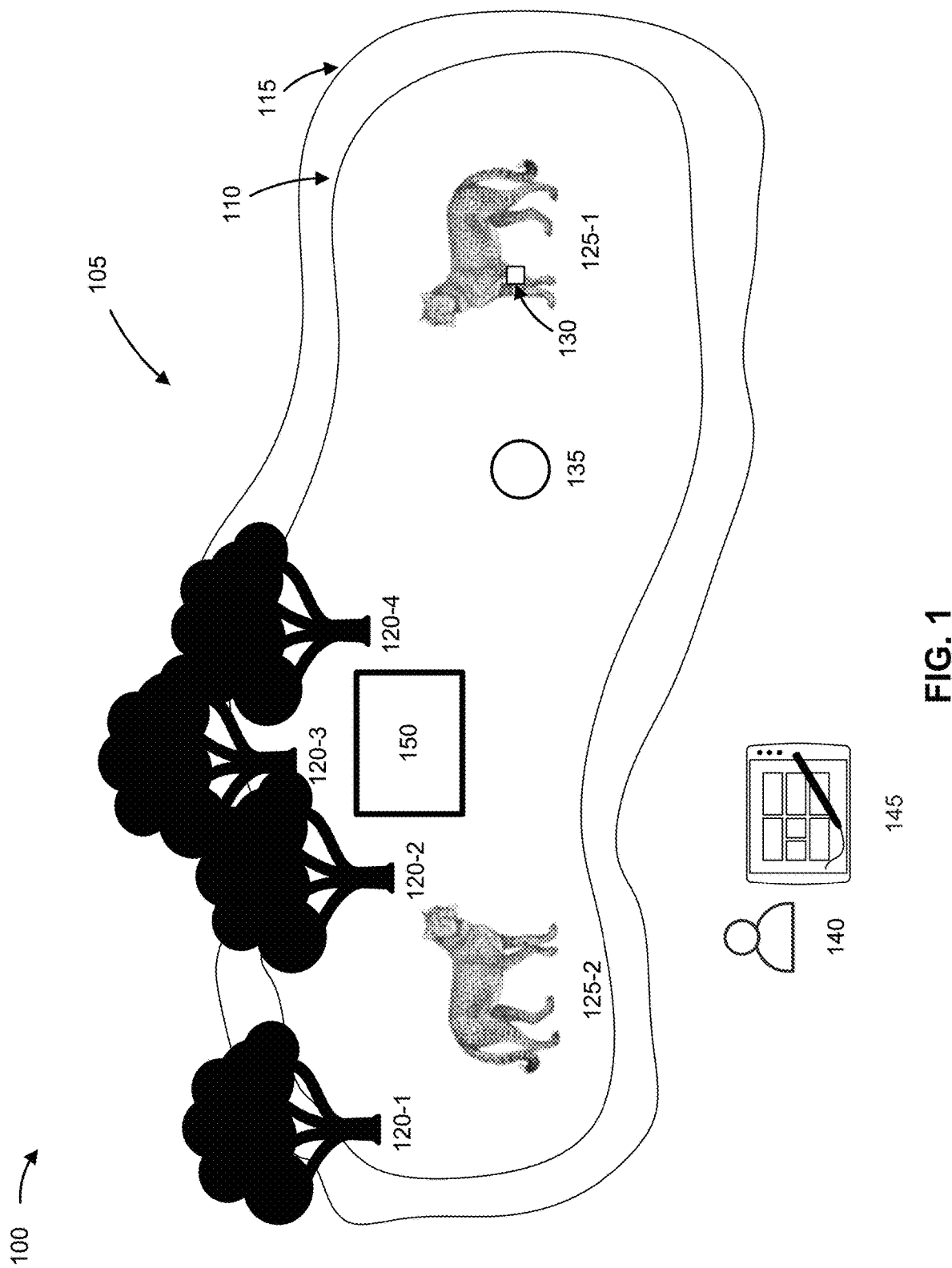
FIG. 1 is an example environment in which systems and/or methods described herein may be implemented.

The following detailed description of example implementations refers to the accompanying drawings. The same reference numbers in different drawings may identify the same or similar elements.

A ball may be used to stimulate the movement of an animal. In some situations, the ball may include a mechanism that enables the ball to move autonomously. For example, the ball may include offset weights. Alternatively, the ball may include a weighted device moving around a bottom surface of the ball (e.g., a surface that contacts the ground surface). In some situations, the ball may be controlled by a mobile device.

In some situations, numerous devices may be used to monitor the movement of the animal (e.g., the movement as a result of the animal interacting with the ball). The numerous devices may include numerous camera devices, numerous microphones, numerous sensor devices, among other devices. The sensor devices may include a speedometer, an accelerometer, and/or a motion sensor device, among others sensor devices.

Configuring the numerous devices to monitor the animal is a time-consuming task and a complex task. Similarly, configuring the numerous devices to communicate with each other is a time-consuming task and a complex task. Configuring the numerous devices consumes a substantial amount of computing resources (e.g., to configure the numerous devices), networking resources (e.g., to enable the numerous devices to communicate with each other), and storage resources (e.g., to store data obtained by the numerous devices).

Accordingly, a need exists for devices and methods that stimulate activity, exercise, and natural behaviors of animals. Additionally, a need exists for devices and methods that monitor the movement of animals without consuming a substantial amount of computing resources, networking resources, and storage resources.

Implementations described herein are also directed to an enrichment device configured to stimulate activity, exercise, and natural behaviors in an animal. The animal may be a particular species. In some examples, the enrichment device may be a ball. Additionally, or alternatively, the enrichment device may include a global positioning system (GPS) unit, a motor, a controller, and/or an inertial measurement unit (IMU), among other examples.

In some implementations, the enrichment device may be configured with different movement profiles for different geographical areas. For example, the enrichment device may be configured with a first movement for a first geographical area, a second movement for a second geographical area, and so on. In some instances, a movement profile may identify one or more motions of the enrichment device. The one or more motions may include a forward motion, a backward motion, a lateral motion, a jumping motion, and/or a skipping motion, among other examples. In some situations, the one or more motions may include an initial subtle movement to attract the attention of animals 125 followed by additional motions. In some instances, a geographical area may be a habitat of animals.

In some implementations, the enrichment device may be configured with different movement profiles for different species of animals or individual animals. For example, the enrichment device may be configured with a third movement for a first species, a fourth movement for a second species, and so on. For instance, the movement of enrichment device 135 for leopards may be faster than the movement of enrichment device 135 for goats (or other animals that are typically slower than leopards). Additionally, or alternatively, the enrichment device may be configured with different movement profiles for different characteristics, such as different ages, different weights, among other examples.

In some implementations, the GPS unit may generate GPS data and the controller may determine a location of the enrichment device using the GPS data. For example, the controller may determine a geographical area (e.g., habitat) in which the enrichment device is located. The controller may implement a geofence based on a boundary of the geographical area. In some implementations, the controller may prevent operation of the enrichment device when the enrichment device is located outside of the boundary of the geographical area. For example, the controller may cause the enrichment device to be turned off. The controller may identify a movement profile associated with the geographical area and may cause the enrichment device to move in accordance with the movement profile.

The controller may determine whether an animal interaction has been detected (e.g., before, during, and/or after the movement of the enrichment device). The "animal interaction" may refer to the animal interacting with the enrichment device by way of physical contact, such as batting the enrichment device, swatting the enrichment device, pushing the enrichment device, and/or kicking the enrichment device, among other examples. In some situations, the "animal interaction" may, additionally or alternatively, refer to chasing the enrichment device, running away from the enrichment device, stalking the enrichment device, batting the enrichment device, among other examples species appropriate natural behaviors triggered by the movement of the ball.

In some situations, based on detecting an animal interaction, the controller determine an identity of the animal. For example, the enrichment device may include a reader device that is configured to scan areas surrounding to detect the presence of animals. For instance, the reader device may determine whether a signal is received from a wireless device provided on the animal. As an example, the wireless device may be a short-range device. The signal may include animal information identifying the animal. The animal information may indicate an identity of the individual animal and/or may identify one or more characteristics of the animal, such as a species of the animal, an age of the animal, a weight of the animal, a medical condition of the animal, among other examples.

Based on the animal information identifying the animal, the controller may adjust the movement of the enrichment device. For example, the controller may adjust a speed of the movement, adjust a direction of the movement, adjust a type of the movement, among other examples. For example, when adjusting the type of the movement, the enrichment device may transition from rolling to skipping.

The controller may determine a location of the animal interaction and may store interaction information regarding the animal interaction. The interaction information may include location information identifying the location, time information identifying a time of the animal interaction, and/or the animal information, among other examples. In some situations, depending on the quantity of times and/or a duration of the animal interaction detected at the location, the location information may indicate that the location is a desired location.

In some implementations, the controller may cause the enrichment device to dispense items to the animal. For example, based detecting the animal interaction, the controller may cause the enrichment device to dispense a food reinforcer (e.g., a reward) to the animal. Additionally, or alternatively, based on the animal information, the controller may cause the enrichment device to dispense a medication to the animal.

In some implementations, a size of the enrichment device may prevent the animal from ingesting the enrichment device. Additionally, or alternatively, a material of the enrichment device may prevent the animal from dismantling the enrichment device. The enrichment device may be configured for autonomous operation (e.g., operate autonomously), configured for manual operation (e.g., operate based on input from an operator), and/or configured for a combination of autonomous operation and manual operation.

Implementations described herein scales up to work with animals of different sizes. Additionally, or alternatively, implementations described herein are configured to be incorporated into a natural habitat of the animals. Additionally, or alternatively, the controller described herein is able to determine a location of the enrichment device and perform data logging to track animal interactions. Furthermore, the location system, of the enrichment device, can be used as a safety feature to suspend operation of the enrichment device if the enrichment device goes outside the boundary of the geographical area (e.g., outside the geofence).

Accordingly, implementations described herein stimulate activity, exercise, and species specific natural behaviors of animals. Additionally, implementations described herein monitor the movement of the animals without consuming the substantial amount of computing resources, networking resources, and storage resources that would have been consumed to monitor the animals using multiple devices.

FIG. 1 is an example environment in which systems and/or methods described herein may be implemented. As shown in FIG. 1, example environment 100 includes a habitat 105. Habitat 105 may include a first boundary 110 and a second boundary 115. First boundary 110 may be an inner boundary and second boundary 115 may be an outer boundary. In some examples, first boundary 110 and second boundary 115 may form a moat. First boundary 110 and second boundary 115 may be collectively referred to as boundaries of habitat 105.

Habitat 105 may include a first tree 120-1, a second tree 120-2, a third tree 120-3, a fourth tree 120-4, and so on (collectively forming a landscape). Habitat 105 may include a first animal 125-1, a second animal 125-2, and an enrichment device 135. First animal 125-1 and second animal 125-2 may be collectively referred to as "animals 125." As shown in FIG. 1, first animal 125-1 may be a leopard. While FIG. 1 depicts two animals 125, in practice, habitat 105 may include more or fewer animals 125.

In some instances, a wireless device 130 may be attached to first animal 125-1. Wireless device 130 may include one or more devices configured to provide a signal to enrichment device 135. The signal may include animal information identifying the animal. The animal information may indicate an identity of the animal and/or may identify one or more characteristics of the animal, such as a species of the animal, an age of the animal, a weight of the animal, and/or a medical condition of the animal, among other examples.

Wireless device 130 may provide a signal periodically (e.g., every 30 seconds, every minute, or every 3 minutes, among other examples). Additionally, or alternatively, wireless device 130 may provide the signal based on a trigger (e.g., based on a request from a controller of enrichment device 135). In some implementations, wireless device 130 may be a short-range device. For example, wireless device 130 may include a Radio-frequency identification (RFID) device, a Bluetooth device, a near-field communication (NFC) device, an ultra-wideband (UWB) device, a Wi-Fi device, among other examples. As an example, wireless device 130 may be an RFID tag.

Enrichment device 135 may include one or more devices configured to stimulate movements of animals 125 and to generate interaction information regarding the movements. By stimulating the movements of animals 125, enrichment device 135 may stimulate activity, exercise, and species appropriate natural behaviors of animals 125. The interaction information may be identified a type of animal interaction, a location of the animal interaction, an indication of whether the location is a preferred location, a date and/or a time of the animal location. As shown in FIG. 1, enrichment device 135 may be a ball. While the example in FIG. 1 depicts enrichment device 135 as having a circular shape, in practice, enrichment device 135 may be of a shape that is different than enrichment device 135 is described in more detail in FIG. 2. In some implementations, enrichment device 135 may be of a different shape and/or a different size for different geographical areas (e.g., different habitats), for different species of animals 125, and/or for different characteristics of animals, among other examples.

The interaction information may be stored in a data store associated with enrichment device 135. In some situations, enrichment device 135 may provide the interaction information a user device 145 of an operator 140. The user device 145 may include one or more devices capable of receiving, generating, storing, processing, and/or providing information associated with movements of animals 125, as described elsewhere herein. The user device 145 may include a communication device and a computing device.

For example, the user device 145 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, user device 145 may be used to control an operation of enrichment device 135. For example, user device 145 may be used to transmit instructions to cause a movement of enrichment device 135. For instance, user device 145 may be used to override a current movement profile of enrichment device 135.

In some implementations, habitat 105 may include a container 150 that is configured to be used to store enrichment device 135. Container 150 may enable operator to provide enrichment device 135 to animals 125 and/or remove enrichment device 135 remotely (e.g., without interacting with animals 125).

As shown in FIG. 1, the landscape, animals 125, enrichment device 135, and container 150 are provided inside the boundaries of habitat 105. As shown also shown in FIG. 1, operator 140 and user device 145 are located outside the boundaries of habitat 105. Operator 140 and user device 145 may be located outside of the boundaries to prevent interactions between operator 140 and animals 125.

Devices and/or elements of environment 100 may interconnect via wired connections and/or wireless connections. In some examples, a network may enable communication among the devices of environment 100. The network includes one or more wired and/or wireless networks. For example, the network may include a cellular network, a public land mobile network (PLMN), a local area network (LAN), a wide area network (WAN), a private network, the Internet, and/or a combination of these or other types of networks.

As indicated above, FIG. 1 is provided as an example. Other examples may differ from what is described with regard to FIG. 1. The number and arrangement of devices shown in FIG. 1 is provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
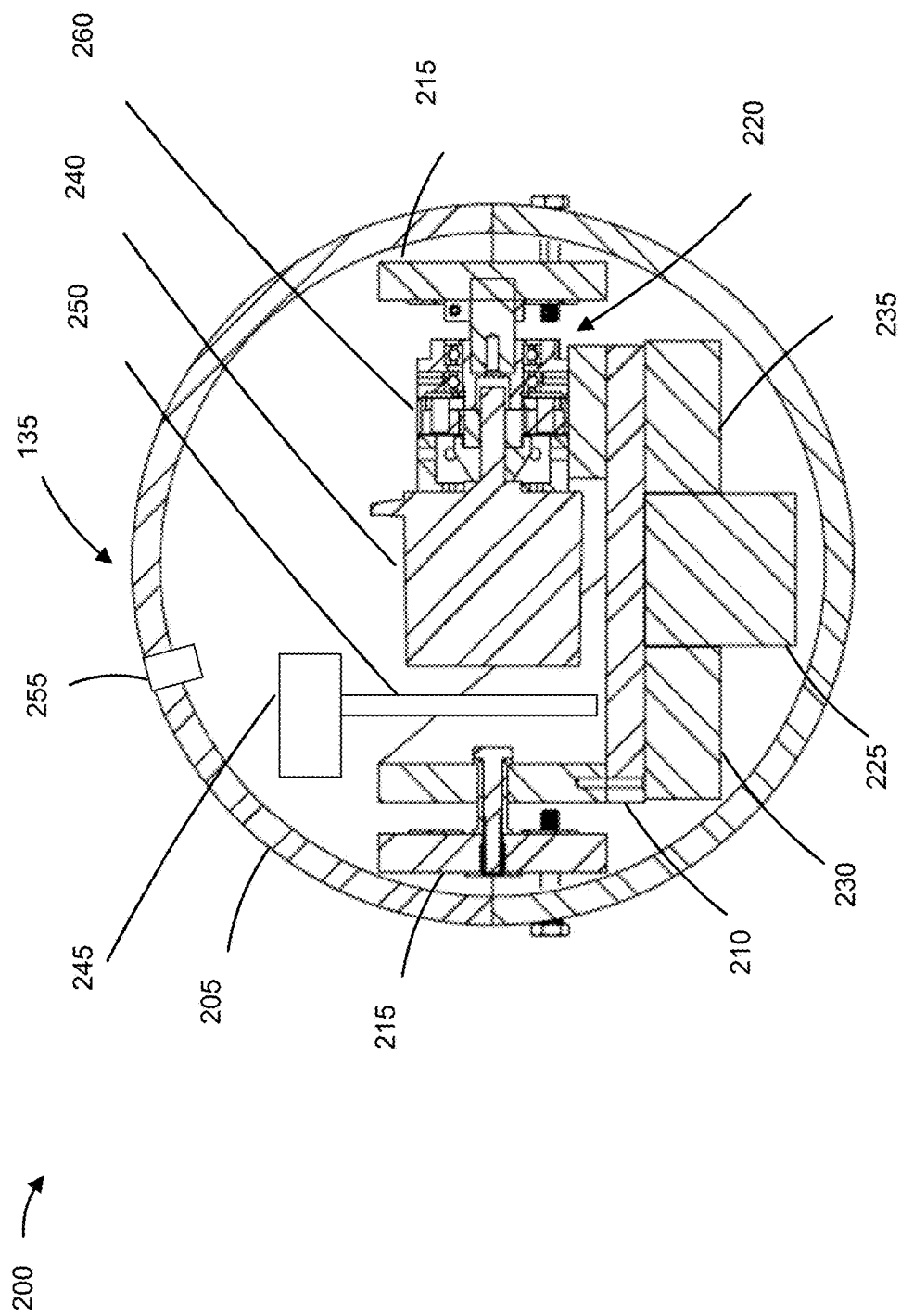
FIG. 2 is a diagram of an example enrichment device described herein.

FIG. 2 is a diagram 200 of an example enrichment device described herein. As shown in FIG. 2, enrichment device 135 may include a shell 205, a housing 210, couplers 215, a motor assembly 220, and a power source 225. Shell 205 may include a durable material that enables animals 125 to interact with enrichment device 135. Motor assembly 220 may be mounted inside housing 210. Motor assembly 220 may include a motor and an encoder. The encoder may generate motor data indicating a rotational speed of the motor. Couplers 215 engage housing 210 so that as the motor is turned, housing 210 will rotate with respect to shell 205. Power source 225 may be coupled to the motor and to housing 210. In some examples, power source 225 may include a battery.

As shown in FIG. 2, enrichment device 135 may further include a GPS unit 230, a reader device 235, an IMU 240, a dispensing unit 245, a camera device 255, and a controller 260. GPS unit 230 may include one or more devices configured to generate GPS data that indicates a location of enrichment device 135. For example, GPS unit 230 may include a GPS receiver. In some situations, the GPS data may include geographical coordinates of the location of enrichment device 135.

Reader device 235 may include one or more devices configured to obtain the signals from wireless device 130. In some implementations, reader device 235 may include a short-range device configured to communicate with wireless device 130. For instance, reader device 235 may receive a signal from wireless device 130 and process the signal (e.g., to determine information about animals 125). As an example, reader device 235 may include an RFID tag reader.

IMU 240 includes one or more devices that are capable of receiving, generating, storing, processing, and/or providing signals that may be used to stimulate movement of animals 125. IMU 240 may include one or more accelerometers and/or one or more gyroscopes. The one or more accelerometers and/or the one or more gyroscopes generate and provide acceleration data. The acceleration data may be signals that can be used to determine an acceleration of enrichment device 135, a velocity of enrichment device 135, and/or a position and orientation of IMU 240 relative to a frame of reference.

Dispensing unit 245 may include one or more devices configured to dispense items to animals 125. The items may include a treat, a meal, medication, and/or a smell, among other examples. In some situations, dispensing unit 245 may be a tray coupled to housing 210 via a rod 250. In some situations, rod 250 may be a threaded rod.

Camera device 255 may include one or more devices configured to capture image data of a surrounding of enrichment device 135. In some instances, the image data may be used to determine whether an animal interaction has been appropriately detected. For example, the image data may indicate whether animals 125 were located within a distance threshold of enrichment device 135 during the animal interaction, whether feet of animals were located within a distance threshold of enrichment device 135 during the animal interaction, and/or whether faces of animals were located within a distance threshold of enrichment device 135 during the animal interaction, among other examples. The image data may be processed using one or more image processing techniques to identify the areas surrounding animals 125, the feet, the faces, among other examples.

Controller 260 (e.g., an electronic control module (ECM)) may control and/or monitor operations of enrichment device 135. For example, controller 260 may control and/or monitor the operations of enrichment device 135 based on signals from GPS unit 230, reader device 235, IMU 240, and/or camera device 255, as described herein. GPS unit 230, reader device 235, IMU 240, and/or camera device 255 may provide the signals periodically (e.g., every thirty seconds, every minute, every 5 minutes, among other examples). Additionally, or alternatively, GPS unit 230, reader device 235, IMU 240, and/or camera device 255 may provide the signals based on a trigger (e.g., based on a request from controller 260).

Controller 260 may cause enrichment device 135 to transition between the autonomous operation, the manual operation, and/or the combination of autonomous operation and manual operation. While FIG. 2 illustrate controller 260 being included in enrichment device 135, in some situations controller 260 may be external with respect to enrichment device 135. For example, controller 260 may be included in user device 145. In this regard, user device 145 may operate as a remote control of enrichment device 135 to control operations of enrichment device 135 remotely.

In some implementations, enrichment device 135 may include a storage device configured to store habitat information regarding different habitats. For example, the habitat information of a habitat may include geographic coordinates of boundaries of the habitat (e.g., a GPS perimeter of the habitat), information identifying a movement profile for the habitat, information identifying a warning zone for enrichment device 135, information identifying a homing location. The boundaries may include the inner boundary and the outer boundary.

In some examples, the warning zone may be based on a threshold distance from the boundaries of the habitat. As an example, a first warning zone may be based on a distance threshold to the inner boundary and a second warning zone may be based on the distance threshold to the outer boundary. Controller 260 may cause enrichment device 135 to stop moving, to move backwards, and/or to reduce a speed of the movement of enrichment device 135 based on controller 260 detecting that enrichment device 135 is approaching the warning zone and/or approaching a boundary of the habitat.

In some examples, the distance threshold may vary for different portions of the habitat. For example, a first distance threshold for a first portion with a downward slope may exceed a second distance threshold for a second portion with an upward slope. For instance, the first distance threshold may exceed the second distance threshold because enrichment device 135 may be subject to rolling on the downward slope at a speed that exceeds a speed at which enrichment device 135 may roll on the upward slope.

Accordingly, the first portion may be identified as a high speed area and the second portion may be identified as a low speed area. In some implementations, controller 260 may implement a geofence, for the habitat, to prevent enrichment device 135 from rolling on the downward slope to the moat. In some examples, controller 260 may cause enrichment device 135 to be turned off if controller 260 detects that enrichment device 135 is located outside of the geofence.

The homing location may be a location, away from animals 125, where enrichment device 135 may remain (or be parked). In some situations, enrichment device 135 may parked at the location, waiting for operator 140 (or another user) to retrieve/recover enrichment device 135. In other words, the homing location may be a location where operator 140 may confidently retrieve enrichment device 135. For example, the homing location may be the location of container 150. In some situations, the location may be static. Additionally, or alternatively, the location may vary based on one or more factors including a time of the day, a date of the week, a desired location, among other examples. As an example, if the desired location is updated to the homing location, the homing location may be changed to prevent any interaction with animals 125 when enrichment device 135 is being retrieved.

In some implementations, the storage device may be pre-loaded with the habitat information. In some situations, as enrichment device 135 moves around the habitat, controller 260 may cause the habitat information to be updated (e.g., to update the boundaries) based on data obtained at different locations of the habitat. The habitat information may be stored in a data store of the storage device. Additionally, or alternatively, the data store may be stored in a device external with respect to enrichment device 135 (e.g., user device 145). The data store may include a database or the like in a data structure, such as a table, a linked list, among other examples.

As indicated above, FIG. 2 is provided as an example. Other examples may differ from what is described with regard to FIG. 2. The number and arrangement of devices shown in FIG. 2 is provided as an example. In practice, there may be additional devices, fewer devices, different devices, or differently arranged devices than those shown in FIG. 2. Furthermore, two or more devices shown in FIG. 1 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIGS. 3A-3E are diagrams of an example implementation 300 associated with stimulating and recording movements of animals. As shown in FIGS. 3A-3E, example implementation 300 includes habitat 105, enrichment device 135, wireless device 130, and user device 145.

Figure 3A:
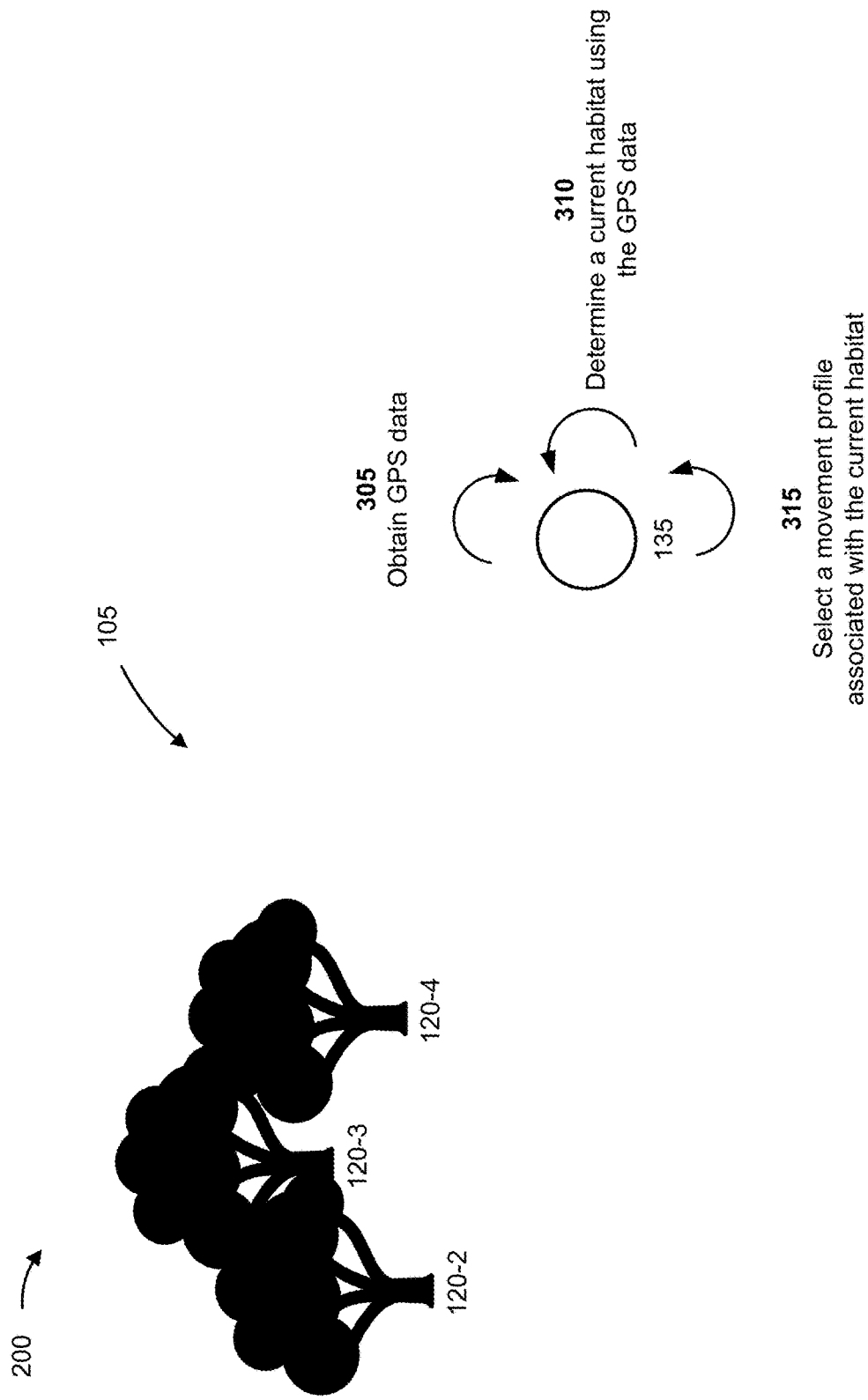

As shown in FIG. 3A, and reference number 305, controller 260 may obtain GPS data. For example, controller 260 may obtain the GPS data from GPS unit 230. In some implementations, controller 260 may obtain the GPS data periodically from GPS unit 230. Additionally, or alternatively, controller 260 may obtain the GPS data based on a request from controller 260. In some examples, the GPS data may include geographical coordinates. Based on the GPS data, controller 260 may determine a location of enrichment device 135.

As shown in FIG. 3A, and reference number 310, controller 260 may determine a current habitat using the GPS data. For example, controller 260 may determine a habitat (e.g., a geographical area that includes the location of enrichment device 135). In some implementations, controller 260 may search boundaries of different habitats to determine a boundary of a habitat that includes the location of enrichment device 135. In other words, controller 260 may determine a geographical area that includes the location of enrichment device 135.

As shown in FIG. 3A, and reference number 315, controller 260 may select a movement profile associated with the current habitat. For example, controller 260 may obtain the movement profile using habitat information identifying the current habitat (e.g., habitat 105). For instance, controller 260 may perform a lookup of the data store. The lookup may be performed using the GPS data to identify the habitat information of habitat 105.

In some examples, the data store may store information identifying a movement profile in association with information identifying a geographical area (e.g., in association of habitat information of a habitat). Additionally, or alternatively, the data store may store information identifying a movement profile in association with a date and/or a time. Additionally, or alternatively, the data store may store information identifying a movement profile in association with a trigger. Additionally, or alternatively, the data store may store information identifying a movement profile in association with information identifying a species of animal. Additionally, or alternatively, the data store may store information identifying a movement profile in association with information identifying a characteristic of a species of animal. In some examples, the date and/or the time may cause enrichment device 135 to move at the date and/or the time, move periodically, among other examples. The trigger may include signals from reader device 235 and/or from another short-range device. The characteristic may include an individual identification, an age, a weight, and/or a medical condition, among other examples.

In some examples, the movement profile may identify one or more motions of the enrichment device. The one or more motions may include a forward motion, a backward motion, a lateral motion, a jumping motion, and/or a skipping motion, among other examples. The one or more motions may be motions that are anticipated to stimulate movements of animals 125.

As shown in FIG. 3B, and reference number 320, controller 260 may cause the enrichment device to move according to the movement profile. In some examples, controller 260 may provide a command to the motor that causes the motor to spin the motor, housing and battery within the shell resulting in movement of enrichment device 135. In this regard, enrichment device 135 may move in a forward motion, a backward motion, a lateral motion, a jumping motion, and/or a skipping motion, among other examples.

As shown in FIG. 3B, and reference number 325, controller 260 may determine whether the enrichment device is within a boundary of the current habitat. For example, controller 260 may periodically determine the location of enrichment device 135. For example, controller 260 may receive GPS data from GPS unit 230 periodically (e.g., every second, every 15 seconds, every 30 seconds, among other examples). Based on receiving the GPS data periodically, controller 260 may determine the location of enrichment device 135.

Controller 260 may determine the boundary of habitat 105 using habitat information of habitat 105. For example, the habitat information may include information identifying the boundaries of habitat 105. Controller 260 may determine whether the location of enrichment device 135 is within a boundary of habitat 105 (e.g., within first boundary 110 of habitat 105 or the inner boundary of habitat 105). In some implementations, if controller 260 determines that enrichment device 135 is within first boundary 110, controller 260 may enable enrichment device 135 to continue to move in accordance with the movement profile.

In some implementations, while with the boundary of enrichment device 135, controller 260 may detect that enrichment device 135 is not moving in accordance with the movement profile. For example, controller 260 may detect that enrichment device 135 is skipping in a first direction instead of rolling in a second direction (opposite the first direction) as indicated by the movement profile. In this regard, controller 260 may determine whether the movement of enrichment device 135 is based on a manual override of the one or more motions of the movement profile.

The manual override may be based on a command from operator 140 using user device 145. For example, operator 140 may determine that enrichment device 135 is to perform one or more alternatives motions to better simulate animals 125 (the one or more alternative motions being different than the one or more motions of the movement). Additionally, alternatively, operator 140 may determine that enrichment device 135 is to perform the one or more alternatives motions to improve a durability of enrichment device 135.

Additionally, alternatively, operator 140 may determine that enrichment device 135 is to perform the one or more alternatives motions to direct enrichment device 135 to a desired location. Additionally, alternatively, operator 140 may determine that enrichment device 135 is to perform the one or more alternatives motions for a different reason. Accordingly, operator 140 may cause user device 145 to provide a command to enrichment device 135 to cause enrichment device 135 to perform the one or more alternative motions.

In some examples, if controller 260 determines that the command has been received from user device 145, controller 260 may cause enrichment device 135 to perform the one or more alternative motions. Alternatively, if controller 260 determines that the command has not been received from user device 145, controller 260 may prevent enrichment device 135 from performing the one or more alternative motions.

In some implementations, controller 260 may cause enrichment device 135 to move based on detecting the presence of a short-range device. For example, the short-range device may be provided on a vehicle that is driving through habitat 105. In this regard, based on detecting the presence of the short-range device as the vehicle travels by enrichment device 135, controller 260 may cause enrichment device 135 to move. In some instances, controller 260 may cause enrichment device 135 to move in accordance with the movement profile.

As shown in FIG. 3B, and reference number 330, controller 260 may adjust a movement of the enrichment device based on determining whether the enrichment device is within the boundary. In some implementations, based on determining that enrichment device 135 is not within the boundary of habitat 105, controller 260 may adjust the movement of enrichment device 135. For example, controller 260 may cause enrichment device 135 to stop moving. Additionally, or alternatively, controller 260 may cause enrichment device 135 to move in a direction that is opposite to the boundary. For example, controller 260 may cause enrichment device 135 to reverse and move toward a center of enrichment device 135.

Figure 3C:
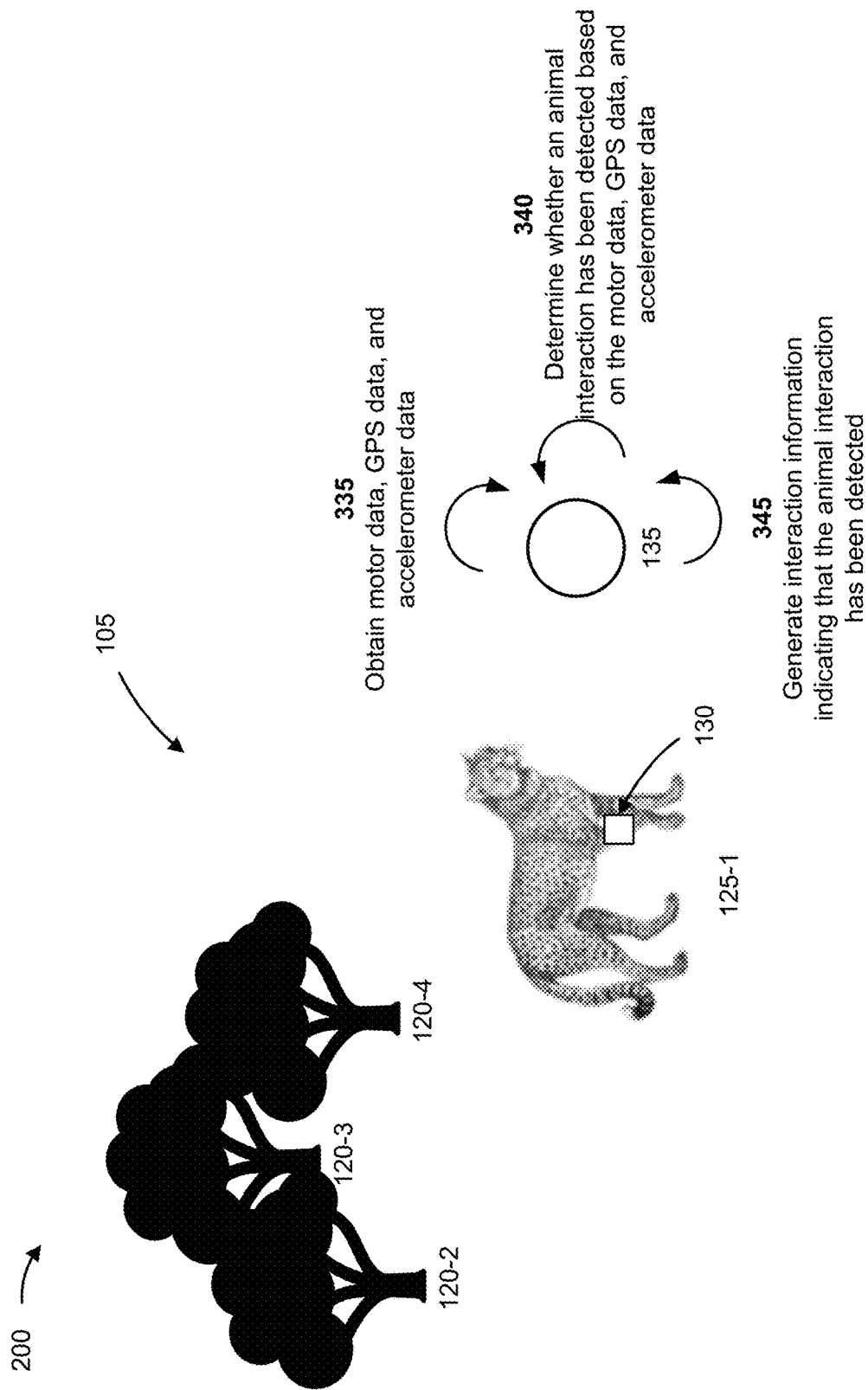

As shown in FIG. 3C, and reference number 335, controller 260 may obtain motor data, GPS data, and accelerometer data. For example, the motor data may indicate a speed of the motor of enrichment device 135 (e.g., a rotational speed). The motor data may be generated by the encoder of motor assembly 220. The GPS data may be generated by GPS unit 230. The accelerometer data may be generated by IMU 240. Controller 260 may obtain the motor data, the GPS data, and/or the accelerometer data periodically and/or based on a trigger, as explained herein.

As shown in FIG. 3C, and reference number 340, controller 260 may determine whether an animal interaction has been detected based on the motor data, the GPS data, and the accelerometer data. In some implementations, controller 260 may compare the motor data and a combination of the GPS data and the accelerometer data. For example, controller 260 may determine an expected location, an expected acceleration, an expected velocity, among other examples, that are expected based on the speed of the motor identified by the motor data.

The motor data may be commanded data (e.g., commanded by operator 140 using user device 145). In other words, the motor data may be based on commands provided by user device 145 to enrichment device 135. The acceleration data may be observed data. In some implementations, the expected location, the expected acceleration, and/or the expected velocity may be included in the habitat information of habitat 105.

In this regard, controller 260 may determine whether the GPS data and/or the accelerometer data identify the expected location, the expected acceleration, and/or the expected velocity. If controller 260 determines that the GPS data and/or the accelerometer data identify the expected location, the expected acceleration, and/or the expected velocity, controller 260 may determine that enrichment device 135 moving in accordance with the movement profile. Accordingly, controller 260 may determine that an animal interaction has not been detected.

Alternatively, if controller 260 determines that the GPS data and/or the accelerometer data does not identify the expected location, the expected acceleration, and/or the expected velocity, controller 260 may determine whether the movement of controller 260 is a normal/expected movement of enrichment device 135 over a rough terrain or whether the movement is an abnormal/unexpected movement of enrichment device 135. In some examples, the abnormal/unexpected movement may occur when enrichment device 135 is accidentally dropped (e.g., by operator 140).

In some situations, controller 260 may filter the GPS data and/or the accelerometer data to obtain filtered data. The filtered data may indicate a frequency that may be used to determine whether a normal/expected movement of enrichment device 135 (over a rough terrain) has been detected, determine whether an abnormal/unexpected movement of enrichment device 135 has been detected, or determine whether an animal interaction has been detected.

For example, controller 260 may classify the frequency as a first frequency indicating that a normal/expected movement of enrichment device 135 (over a rough terrain) has been detected, a second frequency indicating that an abnormal/unexpected movement of enrichment device 135 has been detected, or a third frequency indicating that an animal interaction has been detected.

In some situations, the first frequency may indicate a spike in an acceleration of enrichment device 135. The spike in the acceleration may indicate that enrichment device 135 has collided with an obstructing item (e.g., hit a rock). In some situations, the third frequency may indicate a progressive acceleration of enrichment device 135. The progressive acceleration may occur as animals 125 push enrichment device 135, bat enrichment device 135, or otherwise move enrichment device 135. The progressive acceleration may indicate that an animal interaction has been detected.

In some implementations, controller 260 may use a machine learning model to determine whether a normal/expected movement of enrichment device 135 (over a rough terrain) has been detected, whether an abnormal/unexpected movement of enrichment device 135 has been detected, or whether an animal interaction has been detected. In some implementations, the machine learning model may be trained using training data that includes historical motor data, historical GPS data, historical acceleration data, and/or historical image data. The historical image data may include images of enrichment device 135 moving (e.g., moving about habitat 1050). In some situations, the images may be captured by camera device 255. Additionally, or alternatively, the images may be captured by a camera device external to enrichment device 135.

In some examples, the machine learning model may receive, as an output, the motor data, the GPS data, and the accelerometer data. The machine learning model may provide, as an output, information indicating whether a normal/expected movement of enrichment device 135 (over a rough terrain) has been detected, whether an abnormal/unexpected movement of enrichment device 135 has been detected, or whether an animal interaction has been detected.

In some examples, the machine learning model may be implemented on enrichment device 135. Additionally, or alternatively, the machine learning model may be implemented on a device external with respect to enrichment device 135.

As shown in FIG. 3C, and reference number 345, controller 260 may generate interaction information indicating that the animal interaction has been detected. For example, based on determining that the animal interaction has been detected, controller 260 may generate the interaction information. In some implementations, the interaction information may include information identifying the location (determined based on the GPS data), information identifying an area associated with the location, information identifying a date and/or a time of the animal interaction, information identifying a weather condition when the animal interaction occurred, information identifying an environmental condition when the animal interaction occurred, information identifying a duration of the animal interaction, information identifying a quantity of times the animal interaction was detected at the location, among other examples.

In some examples, if controller 260 determines that the quantity of times satisfies a quantity of times threshold and/or if controller 260 determines that the duration of times satisfies a duration threshold, controller 260 may determine that the location is a desired location. Accordingly, controller 260 may include information indicating that the location is a desired location. Identifying the location as a desired location may cause controller 260 to cause enrichment device 135 to move to the location to stimulate additional interactions with animals 125. In some situations, controller 260 may generate a heat map that identifies locations of other animal interactions (e.g., including the location of the animal interaction).

In some situations, controller 260 may determine that an animal interaction has not been detected at a particular location for a period of time. Accordingly, controller 260 may generate interaction information indicating an animal interaction has not been detected at the particular location for the period of time. The period of time may be determined by operator 140 and/or by a worker associated with habitat 105. The interaction information may indicate that the particular location is an undesired location.

In some implementations, based on determining that an animal interaction has not been detected at the particular location for the period of time, controller 260 may update the habitat information to remove the particular location. For example, controller 260 may update the boundaries of habitat 105 to remove the particular location. Alternatively, controller 260 may update the habitat information to identify the particular location as an undesired location. Identifying the particular location as an undesired location may cause controller 260 to prevent enrichment device 135 from moving to the particular location.

In some situations, controller 260 may detect that enrichment device 135 has been immobilized for a period of time. For example, controller 260 may determine that the motor data (e.g., commanded data) indicates a speed of the motor that would cause enrichment device 135 to move. However, controller 260 may determine that the GPS data and/or the acceleration data (e.g., observed data) indicates that enrichment device 135 is not moving. Accordingly, controller 260 may determine that enrichment device 135 is immobilized (e.g., is stuck).

Based on determining that enrichment device 135 is immobilized, controller 260 may determine the location of enrichment device 135. Controller 260 may update the habitat information to identify the particular location as an undesired location, in a manner similar to the manner described above.

Controller 260 may cause the interaction information to be wirelessly provided to one or more devices external with respect to enrichment device 135. The one or more devices may include user device 145, a back office system, among other examples. The interaction information may be provided periodically (e.g., every second, every five seconds, every thirty seconds). Additionally, or alternatively, the interaction information may be provided based on trigger (e.g., based on a request from the one or more device, based on detecting the animal interaction, based on detecting that enrichment device 135 is immobilized). In some situations, the interaction information may be saved on a memory of enrichment device 135 and subsequently retrieved for review.

In some situations, the interaction information may be used to determine a period of time during which animals 125 are active. Additionally, or alternatively, the interaction information may be used to determine a period of time during which animals 125 are inactive.

In some implementations, controller 260 may track a usage of enrichment device 135. For example, controller 260 may generate and update usage information indicating the usage of enrichment device 135. In some situations, the usage information may include an amount of usage, a total amount of time of usage, a distance traveled by enrichment device 135, among other examples. The usage information may be for a period of time (e.g., per day, per week, per month, among other examples).

Based on the usage information, controller 260 may determine whether enrichment device 135 is under used or overused. For example, controller 260 may compare the usage information and a usage threshold. Controller 260 may determine that enrichment device 135 is under used if the usage information does not satisfy the usage threshold. Alternatively, controller 260 may determine that enrichment device 135 is overused if the usage information satisfies the usage threshold. In some instances, if controller 260 determines that enrichment device 135 is overused, controller 260 may limit or reduce a quantity of movement performed by enrichment device 135. For example, controller 260 may cause enrichment device 135 to move during one or more times during the day, one or more times during the evening, and so on. Controller 260 may limit or reduce a quantity of movement to reduce a wear and tear of enrichment device 135. In some implementations, the one or more times may be determined by operator 140.

Figure 3D:
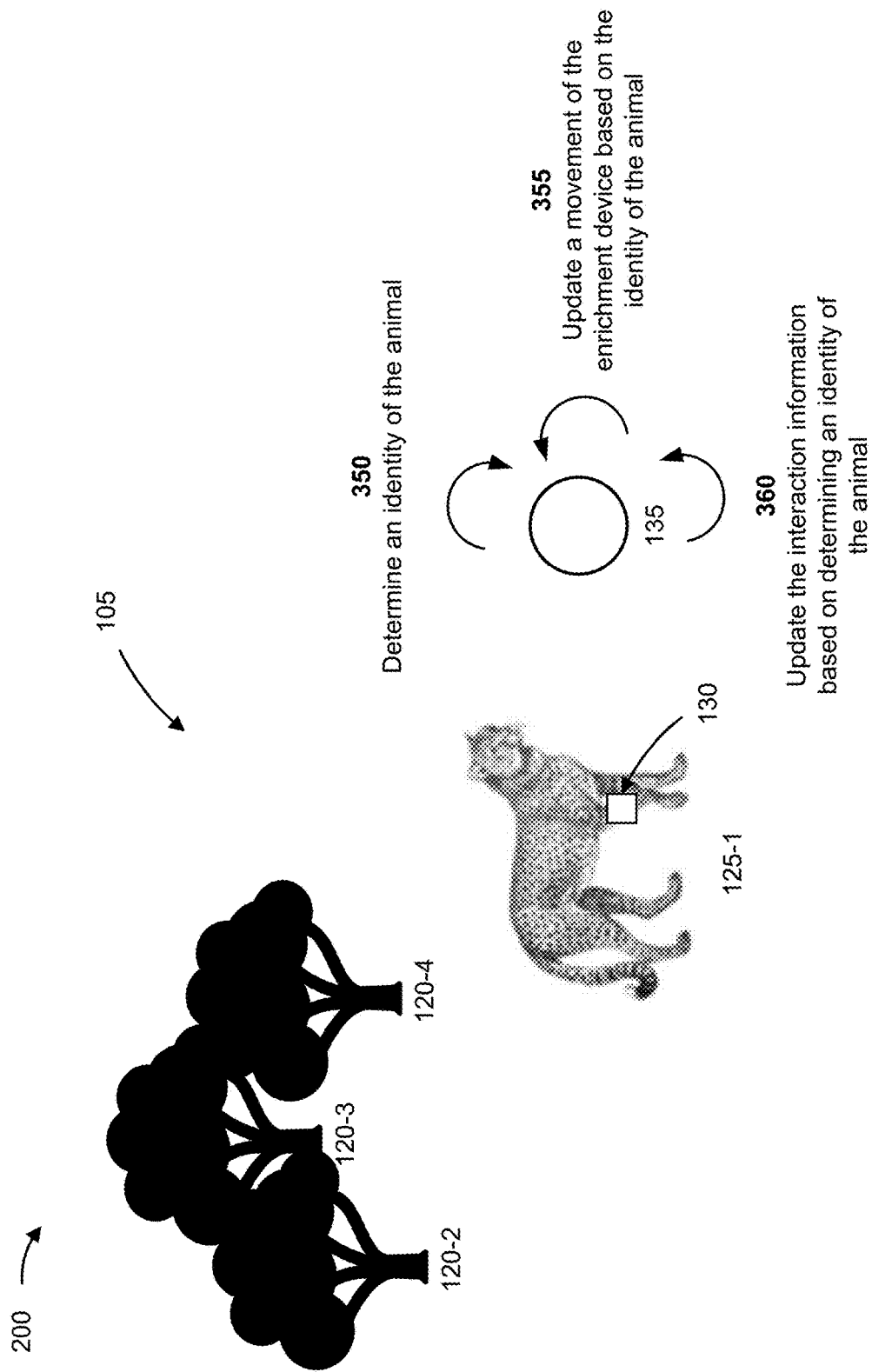

As shown in FIG. 3D, and reference number 350, controller 260 may determine an identity of the animal. For example, controller 260 may determine a likely identity of the animal. In some situations, controller 260 may cause reader device 235 to scan for signals from short-range devices, such as wireless device 130. Based on scanning, controller 260 may receive one or more signals from wireless device 130. The one or more signals may include animal information identifying animal 125-1. The animal information may identify one or more characteristics of animal 125-1, such as a name of animal 125-1, an identifier of animal 125-1, a species of animal 125-1, an age of animal 125-1, a weight of animal 125-1, a medical condition of animal 125-1, among other examples of information that may be used to uniquely identify animal 125-1.

As shown in FIG. 3D, and reference number 355, controller 260 may update a movement of the enrichment device based on the identity of the animal. For example, based on the animal information, controller 260 may adjust the movement of enrichment device 135 identified by the movement profile. In other words, the movement may be adjusted or tailored to meet a desired animal interaction of animal 125-1 (e.g., a desired movement of animal 125-1). For instance, controller 260 may adjust a speed of the movement, adjust a direction of the movement, adjust a duration of the movement, adjust a type of the movement, among other examples.

As an example, controller 260 may decrease the speed of the movement as the age of animal 125-1 increases. As another example, controller 260 may decrease a duration of the movement as the age of animal 125-1 increases. In some examples, when adjusting the type of the movement, the enrichment device may transition from rolling to skipping.

While the example herein has been described with respect to detecting a short-range device on animals 125, implementations described herein are applicable to detecting a short-range device provided on an item and adjusting the movement of enrichment device 135. The item may be a vehicle, a user device, a tree, among other examples of mobile items and stationary items.

As shown in FIG. 3D, and reference number 360, controller 260 may update the interaction information based on determining an identity of the animal. For example, controller 260 may update the interaction information to indicate that animal 125-1 interacted with enrichment device 135, indicate a date and/or a time of the animal interaction, a duration of the animal interaction, among other examples. In some situations, the interaction information may be updated to include the animal information identifying animal 125-1.

In some situations, controller 260 may update the animal information to include an interaction profile of interactions with level of engagement. For example, the interaction profile may indicate whether animal 125-1 is regularly interacting with enrichment device 135. For instance, the interaction profile may indicate a quantity of times animal 125-1 interacts with enrichment device 135, a duration of the animal interaction, among other examples.

In some situations, controller 260 may update the animal information regarding a trend of the animal interactions of animal 125-1. For example, the trend may indicate whether animal 125-1 is interacting more or interacting less over a period of time.

Figure 3E:
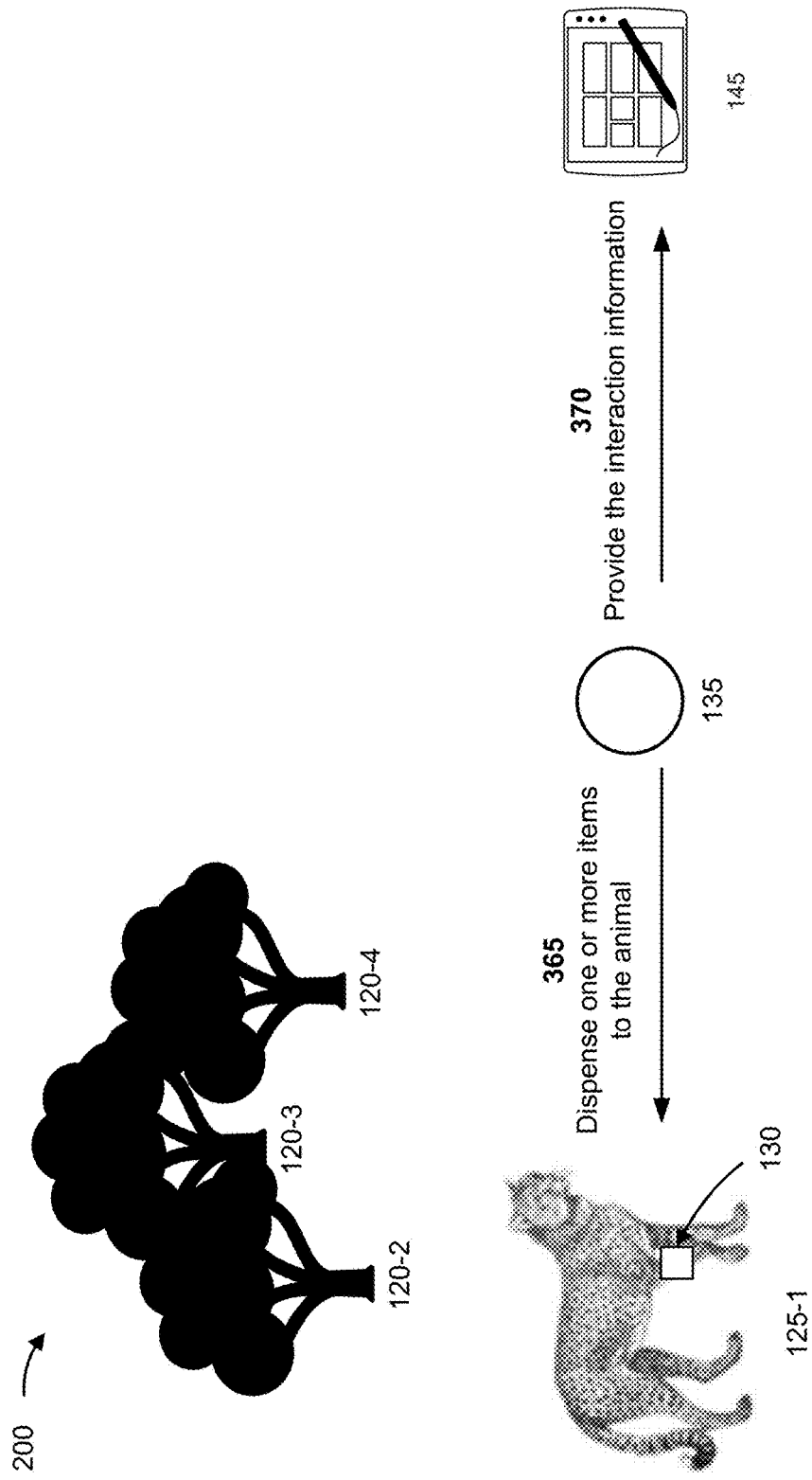

As shown in FIG. 3E, and reference number 365, controller 260 may dispense one or more items to the animal. Controller 260 may dispense the one or more items to the animal while enrichment device 135 is stationary and/or while enrichment device 135 is in motion. In some implementations, controller 260 may cause enrichment device 135 to dispense the one or more items to animal 125-1. The one or more items may be dispensed based on the interaction profile of animal 125, based on the trend, among other examples. Additionally, or alternatively, the one or more items may be dispensed based on the location of enrichment device 135, based on a proximity to animal 125-1, based on a trigger, among other examples.

The proximity to animal 125-1 may be based on a signal strength of wireless device 130. The trigger may be a command from user device 145.

Controller 260 may cause rod 250 to extend dispensing unit 245. Dispensing unit 245 may dispense editable items, such treats, medications, among other examples. For example, the treats may be provided as a reward for interacting with enrichment device 135. In some situations, controller 260 may track a behavior of animal 125-1 to determine whether the treats did stimulate additional movements of animal 125-1. In some situations, dispensing unit 245 may dispense the medication based on information regarding medication provided to animal 125-1, as included in the animal information.

In some examples, controller 260 may cause sound to be emitted to attract animal 125-1. In some examples, controller 260 may cause enrichment device 135 to be illuminated, cause lights to shine according to a pattern determined by operator 140, among other examples.

As shown in FIG. 3E, and reference number 370, controller 260 may provide the interaction information. For example, controller 260 may provide the interaction information to user device 145. In some situations, the interaction information may be provided as a dashboard of animal interactions. The dashboard may be updated during the movement of enrichment device 135 (e.g., in real time or near real time).

In some implementations, the interaction information may be used to adjust environment conditions in habitat 105 to stimulate movements of animal 125. For example, the interaction information may indicate weather conditions and/or environmental conditions that stimulate movements of animal 125-1 and indicate weather conditions and/or environmental conditions that impede movements of animal 125-1. Accordingly, based on the interaction information, controller 260 may cause adjust humidity, temperature, shade, among other examples, to stimulate movements of animal 125-1. For example, controller 260 may cause the shade to be increased, cause the shade to be decreased, cause misters to be activated to increase humidity, among other examples.

Implementations described herein scales up to work with animals of different sizes. Additionally, or alternatively, implementations described herein are configured to be incorporated into a natural habitat of the animals. Additionally, or alternatively, controller 260 described herein is able to determine a location of enrichment device 135 and perform data logging to track animal interactions. Furthermore, the location system, of the enrichment device, can be used as a safety feature to suspend operation of the enrichment device if the enrichment device goes outside the boundary of the geographical area (e.g., outside the geofence).

In some examples, the information collected by enrichment device 135 (e.g., controller 260) may be used to encourage behavior in areas of habitat 105 that are less common or with better lines of sight. For example, controller 260 may direct enrichment device 135 to the areas and cause enrichment device 135 to move about the areas, for a period of time, to stimulate animal interactions in the areas. In some situations, a shell of enrichment device 135 may be compared to an internal armature of enrichment device 135.

Accordingly, implementations described herein stimulate activity, exercise, and opportunities for species appropriate natural behaviors of animals. Additionally, implementations described herein monitor the movement of the animals without consuming the substantial amount of computing resources, networking resources, and storage resources that would have been consumed to monitor the animals using multiple devices.

Implementations described herein may utilize a same control software (or even a ball) with different animals. The storage device associated with enrichment device 135 may include a library of different habitats to determine location. The movement profile may identify pre-programmed actions that can be executed within the boundaries of habitat 105.

As indicated above, FIGS. 3A-3E are provided as an example. Other examples may differ from what is described with regard to FIGS. 3A-3E. The number and arrangement of devices shown in FIGS. 3A-3E are provided as an example. In practice, there may be additional devices, fewer devices, different devices, or differently arranged devices than those shown in FIGS. 3A-3E. Furthermore, two or more devices shown in FIGS. 3A-3E may be implemented within a single device, or a single device shown in FIGS. 3A-3E may be implemented as multiple, distributed devices. Additionally, or alternatively, a set of devices (e.g., one or more devices) shown in FIGS. 3A-3E may perform one or more functions described as being performed by another set of devices shown in FIGS. 3A-3E.

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

Figure 4:
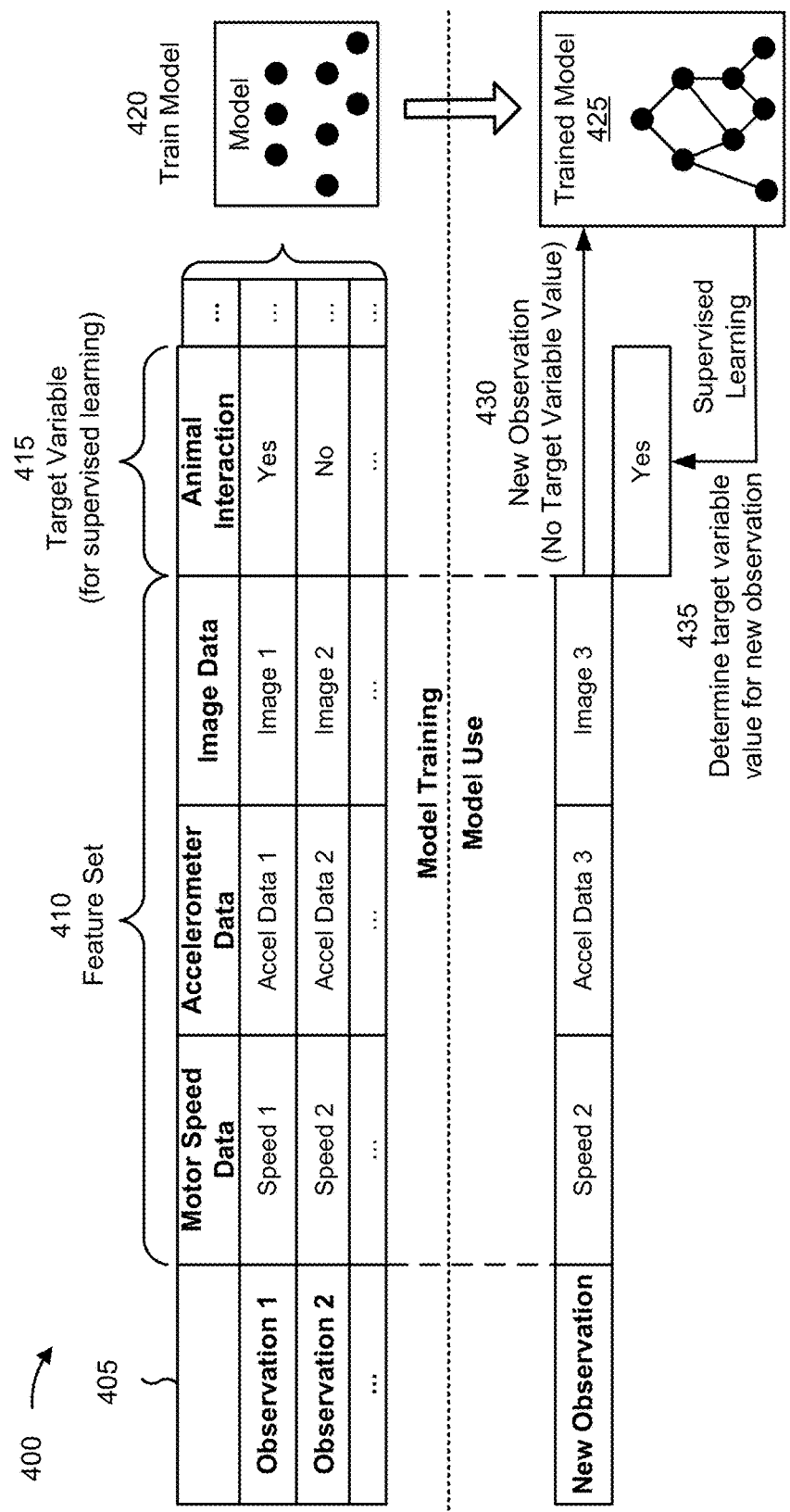
FIG. 4 is a diagram illustrating an example of training and using a machine learning model in connection with detecting an animal interaction.

FIG. 4 is a diagram illustrating an example 400 of training and using a machine learning model in connection with stimulating and recording movements of animals. The machine learning model training and usage described herein may be performed using a machine learning system. The machine learning system may include or may be included in a computing device, a server, a cloud computing environment, or the like, such as controller 260 described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from controller 260, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from controller 260. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of Motor Speed Data, a second feature of Accelerometer Data, a third feature of Image Data, and so on. As shown, for a first observation, the first feature may have a value of Speed 1, the second feature may have a value of Accel Data 1, the third feature may have a value of Image 1, and so on. These features and feature values are provided as examples, and may differ in other examples. For example, the feature set may include one or more of the following features: GPS Data.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is Animal Interaction, which has a value of Yes for the first observation.

The feature set and target variable described above are provided as examples, and other examples may differ from what is described above. For example, for a target variable of Update Geofence, the feature set may include Location, Motor Speed Data, Accelerometer Data, Device Immobilized/Stuck.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of Motor Speed Data, a second feature of Accelerometer Data, a third feature of Image Data, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of Yes for the target variable of Animal Interaction for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, store animal interaction. The first automated action may include, for example, storing (in a storage device) interaction information indicating that an animal interaction has occurred; storing (in a storage device) interaction information indicating that an animal interaction has not occurred; updating the geofence; and/or transmitting the interaction information; among other examples.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect animal interactions. The machine learning system enables recognition and/or identification of tens, hundreds, thousands, or millions of features and/or feature values for tens, hundreds, thousands, or millions of observations, thereby increasing accuracy and consistency and reducing delay associated with detecting animal interactions relative to requiring computing resources to be allocated for tens, hundreds, or thousands of operators to manually detecting animal interactions using the features or feature values.

As indicated above, FIG. 4 is provided as an example. Other examples may differ from what is described in connection with FIG. 4.

Figure 5:
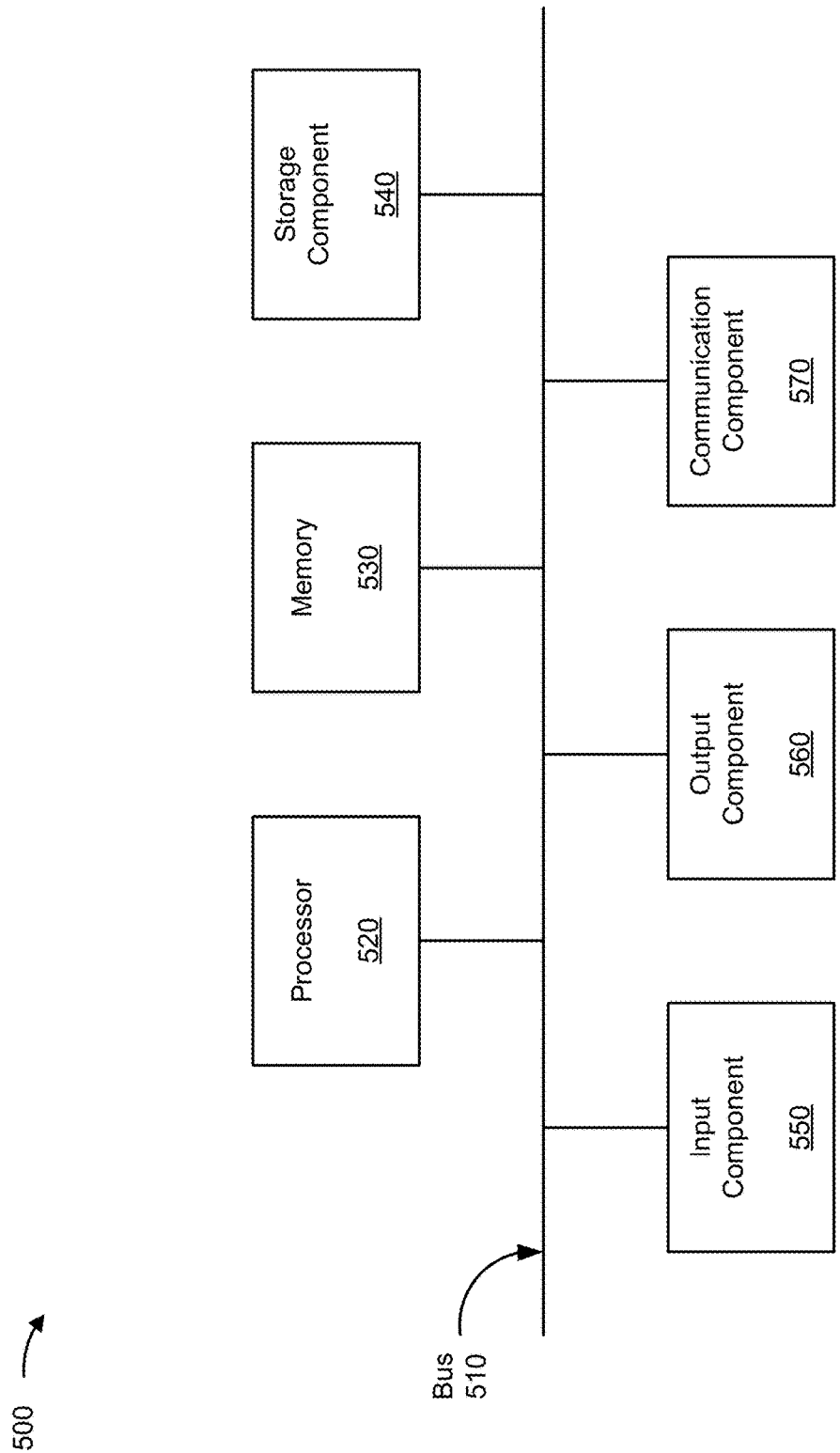
FIG. 5 is a diagram of example components of one or more devices of FIG. 1.

FIG. 5 is a diagram of example components of a device 500, which may correspond to enrichment device 135, wireless device 130, and/or user device 145. In some implementations, enrichment device 135, wireless device 130, and/or user device 145 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with enrichment device for mammals. In some implementations, one or more process blocks of FIG. 6 may be performed by a controller (e.g., controller 260). In some implementations, one or more process blocks of FIG. 6 may be performed by another device or a group of devices separate from or including the controller, such as a GPS unit (e.g., GPS unit 230), a reader device (e.g., reader device 235), and/or an IMU (e.g., IMU 240). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include obtaining global positioning system (GPS) data from a GPS unit of the device (block 610). For example, the controller may obtain global positioning system (GPS) data from a GPS unit of the device, as described above.

As further shown in FIG. 6, process 600 may include determining habitat information identifying a habitat for animals, of a plurality of habitats of animals, using the GPS data (block 620). For example, the controller may determine habitat information identifying a habitat for animals, of a plurality of habitats of animals, using the GPS data, as described above.

As further shown in FIG. 6, process 600 may include determining a geofence of the habitat for animals based on the habitat information (block 630). For example, the controller may determine a geofence of the habitat for animals based on the habitat information, as described above.

As further shown in FIG. 6, process 600 may include determining a movement profile associated with the habitat for animals using the habitat information, wherein the movement profile identifies one or more motions of the enrichment device (block 640). For example, the controller may determine a movement profile associated with the habitat for animals using the habitat information, wherein the movement profile identifies one or more motions of the enrichment device, as described above. In some implementations, the movement profile identifies one or more motions of the enrichment device.

As further shown in FIG. 6, process 600 may include causing the enrichment device to move, within a boundary of the geofence, in accordance with the one or more motions of the movement profile, wherein the enrichment device moves in accordance with the one or more motions to stimulate movement of one or more animals of the habitat for animals (block 650). For example, the controller may cause the enrichment device to move, within a boundary of the geofence, in accordance with the one or more motions of the movement profile, wherein the enrichment device moves in accordance with the one or more motions to stimulate movement of one or more animals of the habitat for animals, as described above. In some implementations, the enrichment device moves in accordance with the one or more motions to stimulate movement of one or more animals of the habitat for animals. The movement may be part of species appropriate natural behavior of the animal.

Process 600 may include additional implementations, such as any single implementation or any combination of implementations described below and/or in connection with one or more other processes described elsewhere herein.

In a first implementation, the one or more motions are one or more first motions, and wherein the method further comprises determining that the enrichment device is located outside the boundary of the geofence, and causing the enrichment device to move in accordance with one or more second motions based on determining that the enrichment device is located outside the boundary of the geofence.

In a second implementation, process 600 includes detecting an animal interaction indicating that the one or more animals are interacting with the enrichment device, determining a location of the enrichment device when the animal interaction is detected, and updating the habitat information to include information identifying the location as a desired location.

In a third implementation, process 600 includes obtaining motor data from a motor of the enrichment device; determining that the rotational speed does not correlate with the at least one of the acceleration or the velocity; determining a movement of the enrichment device is an unexpected movement based on determining that the rotational speed does not correlate with the at least one of the acceleration or the velocity; and detecting the animal interaction based on determining that the movement of the enrichment device is an unexpected movement. The motor data indicates a rotational speed of the motor. The acceleration data indicates at least one of an acceleration or a velocity of the enrichment device;

In a fourth implementation, detecting that the animal interaction comprises providing the motor data and the acceleration data to a machine learning model, wherein the machine learning model generates, as an output, information indicating whether are interacting with the one or more animals, and determining that the animal interaction based on the output generated by the machine learning model.

In a fifth implementation, the one or more motions are one or more first motions, and wherein the method further comprises determining that the enrichment device is located outside the boundary of the geofence, receiving a request to cause the enrichment device to move the enrichment device in accordance with one or more second motions, determining that the request includes information indicating that the request overrides movements, of the enrichment device, associated with the habitat for animals, and causing the enrichment device to move in accordance with one or more second motions based on determining that the request includes information indicating that the request overrides movements.

In a sixth implementation, process 600 includes determining that the one or more animals have not interacted with the enrichment device for a time threshold, determining a location of the enrichment device when the one or more animals have not interacted with the enrichment device for a time threshold, updating the geofence to remove the location from the geofence of the habitat for animals, and updating the habitat information based on updating the geofence.

In a seventh implementation, process 600 includes determining, multiple times, that the enrichment device is immobile at the undesired location; updating a geofence of the habitat to remove the undesired location based on determining, multiple times, that the enrichment device is immobile at the undesired location; and providing the habitat information to a user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a controller included in an enrichment device, the method comprising:
   obtaining global positioning system (GPS) data from a GPS unit of the enrichment device;
   determining habitat information identifying a habitat for animals, of a plurality of habitats of animals, using the GPS data;
   determining a geofence of the habitat for animals based on the habitat information;
   determining a movement profile associated with the habitat for animals using the habitat information,
      wherein the movement profile identifies one or more motions of the enrichment device; and
   causing the enrichment device to move, within a boundary of the geofence, in accordance with the one or more motions of the movement profile,
      wherein the enrichment device moves in accordance with the one or more motions to stimulate movement of one or more animals of the habitat for animals.

2. The method of claim 1, wherein the one or more motions are one or more first motions, and
   wherein the method further comprises:
      determining that the enrichment device is located outside the boundary of the geofence; and
      causing the enrichment device to move in accordance with one or more second motions based on determining that the enrichment device is located outside the boundary of the geofence.

3. The method of claim 1, further comprising:
   detecting an animal interaction indicating that the one or more animals are interacting with the enrichment device;
   determining a location of the enrichment device when the animal interaction is detected; and
   updating the habitat information to include information identifying the location as a desired location.

4. The method of claim 3, wherein detecting the animal interaction comprises:
   obtaining motor data from a motor of the enrichment device,
      wherein the motor data indicates a rotational speed of the motor;
   obtaining acceleration data from a sensor device of the enrichment device,
      wherein the acceleration data indicates at least one of an acceleration or a velocity of the enrichment device;
   determining that the rotational speed does not correlate with the at least one of the acceleration or the velocity;
   determining a movement of the enrichment device is an unexpected movement based on determining that the rotational speed does not correlate with the at least one of the acceleration or the velocity; and
   detecting the animal interaction based on determining that the movement of the enrichment device is the unexpected movement.

5. The method of claim 4, wherein detecting the animal interaction comprises:
   providing the motor data and the acceleration data to a machine learning model,
      wherein the machine learning model generates, as an output, information indicating whether the one or more animals are interacting with the enrichment device; and
   determining the animal interaction based on the output generated by the machine learning model.

6. The method of claim 1, wherein the one or more motions are one or more first motions, and
   wherein the method further comprises:
      determining that the enrichment device is located outside the boundary of the geofence;
      receiving a request to cause the enrichment device to move in accordance with one or more second motions;
      determining that the request includes information indicating that the request overrides movements, of the enrichment device, associated with the habitat for animals; and
      causing the enrichment device to move in accordance with the one or more second motions based on determining that the request includes information indicating that the request overrides the movements of the enrichment device.

7. The method of claim 1, further comprising:
   determining that the one or more animals have not interacted with the enrichment device for a time threshold;
   determining a location of the enrichment device when the one or more animals have not interacted with the enrichment device for the time threshold;
   updating the geofence to remove the location from the geofence of the habitat for animals; and
   updating the habitat information based on updating the geofence.

8. An enrichment device, comprising:
   a global positioning system (GPS) unit; and
   a controller configured to:
      determine habitat information identifying a habitat for animals, of a plurality of habitats of animals, using first GPS data generated by the GPS unit;
      detect an animal interaction indicating that an animal, of the habitat, is interacting with the enrichment device;
      determine a location of the animal interaction using second GPS data generated by the GPS unit;
      update the habitat information to include desired location information identifying the location as a desired location,
         wherein the desired location information includes the second GPS data; and
      cause the enrichment device to move from a current location of the enrichment device to the desired location to stimulate one or more additional animal interactions.

9. The enrichment device of claim 8, wherein the controller is further configured to:
   determine a time of the animal interaction; and
   update the habitat information to include time information identifying the time of the animal interaction.

10. The enrichment device of claim 9, wherein the controller is further configured to:

provide the habitat information to a user device,
   wherein the habitat information includes the desired location information and the time information.

11. The enrichment device of claim 8, wherein the controller is further configured to:
   detect that the enrichment device is approaching a distance threshold from a boundary of the habitat; and
   adjust a velocity of the enrichment device based on detecting that the enrichment device is within the distance threshold.

12. The enrichment device of claim 8, further comprising a motor,
   wherein the desired location is a first location,
   wherein the current location is a third location, and
   wherein the controller is further configured to:
      determine a speed of the motor,
      determine that the speed satisfies a speed threshold indicating movement of the enrichment device;
      determine that the enrichment device is immobile while the speed is less than the speed threshold;
      detect the third location of the enrichment device using third GPS data generated by the GPS unit; and
      update the habitat information to include undesired location information identifying the third location as an undesired location.

13. The enrichment device of claim 12, wherein the controller is further configured to:
   determine, multiple times, that the enrichment device is immobile at the undesired location;
   update a geofence of the habitat to remove the undesired location based on determining, multiple times, that the enrichment device is immobile at the undesired location; and
   provide the habitat information to a user device.

14. The enrichment device of claim 8, wherein the controller is further configured to:
   receive identification data from an identification device associated with the animal;
   determine an identity of the animal based on the identification data; and
   update the habitat information to further include animal information identifying the animal.

15. A non-transitory computer-readable medium storing a set of instructions, the set of instructions comprising:
   one or more instructions that, when executed by one or more processors of an enrichment device, cause the enrichment device to:
      determine habitat information identifying a geographical area for animals of a plurality of geographical areas for animals,
         wherein the geographical area is identified using first global positioning system (GPS) data generated by a GPS unit of the enrichment device;
      determine that an animal interaction is not detected at a first location corresponding to the first GPS data;
      cause the enrichment device to move to a second location;
      detect one or more animal interactions indicating that an animal is interacting with the enrichment device,
         wherein the one or more animal interactions are determined at the second location;
      determine a location of the one or more animal interactions using second GPS data generated by the GPS unit; and
      update the habitat information to include desired location information identifying the second location as a desired location,
         wherein the desired location information includes the second GPS data.

16. The non-transitory computer-readable medium of claim 15, wherein the one or more instructions further cause the enrichment device to:
   update the habitat information to include undesired location information identifying the first location as an undesired location.

17. The non-transitory computer-readable medium of claim 16, wherein the one or more instructions further cause the enrichment device to:
   provide the habitat information to a user device,
      wherein the habitat information includes the desired location information and the undesired location information.

18. The non-transitory computer-readable medium of claim 15, wherein the one or more instructions further cause the enrichment device to:
   monitor the enrichment device at the first location and at a third location;
   determine, based on monitoring the enrichment device, that one or more first animal interactions satisfy an interaction threshold and that one or more second animal interactions at the third location do not satisfy the interaction threshold; and
   enable the enrichment device to move to the first location based on determining that the one or more first animal interactions satisfy the interaction threshold.

19. The non-transitory computer-readable medium of claim 18, wherein the one or more instructions further cause the enrichment device to:
   prevent the enrichment device from moving to the third location based on determining that the one or more second animal interactions do not satisfy the interaction threshold.

20. The non-transitory computer-readable medium of claim 15, wherein the one or more instructions further cause the enrichment device to:
   receive identification data from an identification device associated with the animal;
   determine an identity of the animal based on the identification data; and
   adjust one or more motions of the enrichment device based on the identity of the animal.

* * * * *